April 13, 1943.   W. J. DOELKER ET AL   2,316,506
METHOD OF MANUFACTURE
Filed May 24, 1941
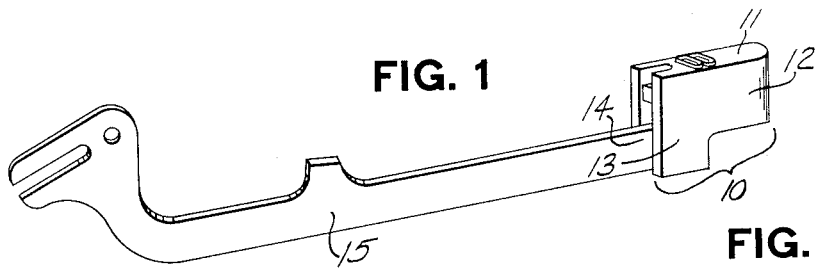
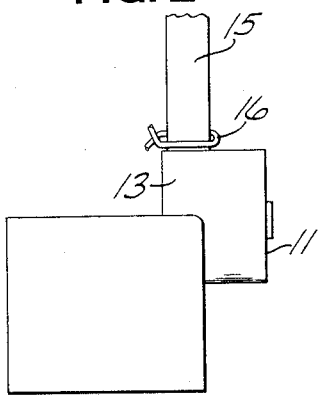
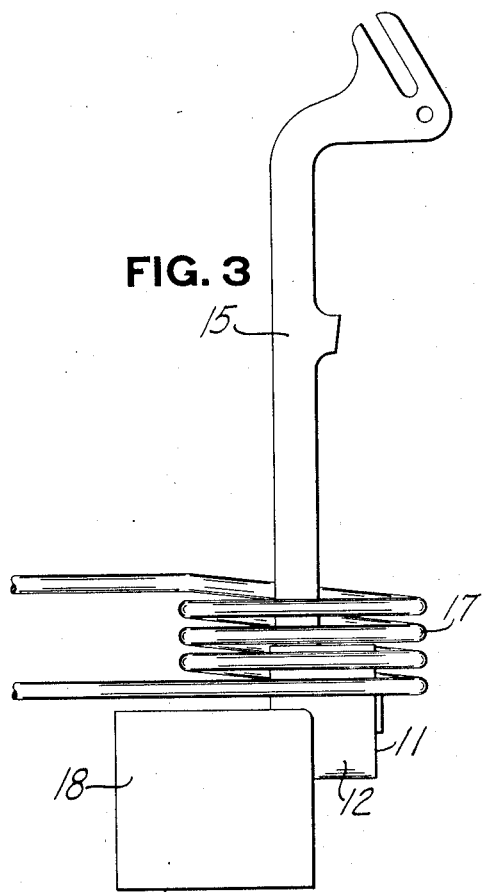
William J. Doelker and
George J. Oswald
Inventors
By
Their Attorney Patented Apr. 13, 1943

2,316,506

UNITED STATES PATENT OFFICE 2,316,506

METHOD OF MANUFACTURE

William J. Doelker and George J. Oswald, Dayton, Ohio, assignors to The National Cash Register Company, Dayton, Ohio, a corporation of Maryland Application May 24, 1941, Serial No. 394,968

6 Claims. (Cl. 219—12)

This invention relates to a method for soldering porous metallic members to other metallic members by high frequency induction heating and more particularly pertains to soldering porous metallic type to typewriter type levers.

In soldering porous metal objects to other metal objects, difficulty is encountered in preventing the solder from being drawn into the porous object, rendering it unfit for use, and this is especially true when small porous objects such as type must be fastened to typewriter type levers, as the proximity of the joint to the character surface and to the part of the porous type body acting as an ink reservoir makes it imperative to localize the application of the solder and the heat to the vicinity of the joint, to shorten the time the solder is in liquid form and to carry away the heat applied to the joint. This invention discloses a novel method of accomplishing these objects by use of high frequency inducting heating.

Therefore, it is the principal object of this invention to provide a method for soldering porous metallic objects to other metallic objects by use of high frequency induction heating.

Another object of the invention is to provide a method for soldering porous metallic type to typewriter levers by use of high frequency induction heating.

Another object of the invention is to provide a method for soldering porous type to typewriter levers so that the solder will be confined to the joint.

Another object of the invention is to provide a method for soldering porous metallic objects to other metal objects by confining the heat to the joint.

With these and incidental objects in view, the invention includes certain novel features, the essential elements of which are set forth in appended claims and a preferred form or embodiment of which is hereinafter described with reference to the drawing which accompanies and forms a part of this specification.

In the drawing:

Fig. 1 shows a typical typewriter type lever inserted into a slot milled in a porous metallic type member.

Fig. 2 shows the method of applying the cold solder to the joint.

Fig. 3 shows the positioning of the type lever and the type member in a high frequency induction coil for the heating thereof.

Fig. 1 discloses a typical porous metal type body 10 having a type face 11, an ink reservoir portion 12, and a slotted supporting portion 13. Inserted into the slotted supporting portion 13 is the type supporting end 14 of a typewriter type lever 15, the parts being so sized as to form a temporary joint by friction. A flux is applied to the joint, and a piece of cold solder 16 (Fig. 2) is wrapped around the type lever close to the joint. The lever and the type, positioned with the type down, are then inserted in a high frequency induction coil 17 (Fig. 3) against a positioning block 18 of material having a high heat conductivity, such as brass. The shape of the type body is preferably conforming to that of the positioning block, so that as large a surface as possible of the type is in contact with the block. The positioning block 18 is so located, as shown in Fig. 3, that the type face 11 and the ink reservoir 12 of the type body are substantially without the intense internal heating zone of the coil. The coil is then energized, so that the solder is melted in two or three seconds, and then deenergized.

It is generally known that solder will flow into a joint to be soldered only when the joint is heated to the proper temperature. It has also been discovered that induction heat can be localized in a restricted zone. By the use of induction heat, for the proper period of time, the solder located within the localized heated zone flows into the joint but does not flow into the pores of the type member, because the type member does not become sufficiently heated. The heat-conducting block 18, on which the type body rests, prevents the body from becoming heated sufficiently to attract the solder, if the coil should be left energized a sufficiently long time, to cause heat to be conducted from the localized heated zone. However, by deenergizing the coil at the proper time, as above pointed out, the temperature of the type body is kept at a temperature below that required to cause the solder to flow into the pores thereof.

The positioning of the type face 11 and the ink reservoir portion 12 of the type without the coil and in contact with the heat-conducting block keeps the portions 11 and 12 cool, preventing destruction of the porosity of the type by becoming solder-saturated. The type lever with the joint type is then removed and cooled.

The principle of the invention is of such wide application in the art of joining porous metal bodies to other objects that it is not to be deemed limited to the particular shape of parts or use to which they are to be put. The invention is applicable to any soldering operation involving porous metal objects where it is desired to retain the porosity, and the claims which follow are to be considered without being limited to the particular embodiment disclosed.

What is claimed is:

1. The method of soldering porous metal type, having a type face and a type body, to a metal lever, the porous type body being provided with a slot, including the step of inserting the lever into the slot; the step of treating the joint with a flux; the step of wrapping a piece of wire solder around the lever at the joint; the step of placing the joint in the interior of a high frequency induction coil so that the joint but not the type face and the entire type body is in the heating zone; the step of applying energizing current to the coil until the solder is melted; and the step of cutting off the energizing current to the coil before the solder saturates the pores of the porous type body.

2. The method of soldering porous metal type, having a type face and a type body, to a lever, including the step of joining the type to the lever by a friction joint; the step of positioning the type body in contact with a heat-conducting means; the step of applying cold solder to the friction joint; and the step of heating the friction joint in a high frequency induction heating coil for a short period of time with the type face and the type body substantially without the heating zone but in contact with the heat-conducting means to limit the flow of the heated solder to the area directly around the friction joint.

3. The method of soldering porous metal type having a type face, an ink reservoir portion, and a support portion, to a lever, including the step of temporarily joining the lever to the support portion; the step of applying cold solder to the temporary joint; and the step of subjecting the joint and the solder to high frequency induction heat localized at the joint with respect to the type face and reservoir portions of the type to limit the flow of solder to the area immediately around the joint.

4. The method of joining porous metallic type, having a printing portion and a joint portion, to a type lever, including the step of placing the joint portion and the type lever in juxtaposition; the step of applying cold solder to the juxtaposed parts; and the step of applying heat by the use of a high frequency induction coil for a time just necessary to melt the solder, the joint portion of the type alone being placed in the heat zone.

5. The method of soldering a porous metal object having a support portion and a working portion to another metal object, including the step of applying cold solder to the intended joint; the step of inserting the objects to be joined in a high frequency induction heating coil so that the support portion of the porous metal is in contact with the other metal object; the step of providing a heat conducting positioning block upon which the porous object is placed so as to keep the working portion of the porous object cool by positioning it out of the heating zone and acting to conduct heat therefrom; and the step of energizing the coil so as to melt the solder quickly.

6. The method of soldering a porous metal object and a supporting object, including the step of holding the objects together at the intended joint; the step of applying a flux to the intended joint; the step of applying cold solder to the intended joint; the step of placing the porous metal object on a rest made of high heat conductive material to cool the porous object when the joint is heated; and the step of applying heat locally to the intended joint by use of high frequency induction heating.

WILLIAM J. DOELKER.
GEORGE J. OSWALD.